United States Patent [19]

Yabe et al.

[11] Patent Number: 4,961,894
[45] Date of Patent: Oct. 9, 1990

[54] PROCESS FOR PRODUCING SYNTHETIC RESIN MOLDED ARTICLES

[75] Inventors: Seizo Yabe, Tokyo; Kunio Yamazaki, Osaka, both of Japan

[73] Assignee: Mitsubishi Gas Chemical Company, Inc., Tokyo, Japan

[21] Appl. No.: 256,939

[22] Filed: Oct. 13, 1988

[30] Foreign Application Priority Data

Oct. 13, 1987 [JP] Japan .................... 62-256214

[51] Int. Cl.$^5$ ............................................. B29C 45/16
[52] U.S. Cl. .................................. 264/259; 264/261; 264/267; 425/3; 425/DIG. 33
[58] Field of Search .............. 264/275, 277, 259, 261, 264/267; 425/3, DIG. 33

[56] References Cited

U.S. PATENT DOCUMENTS 4,427,615  1/1984  Eskesan .................... 264/278

FOREIGN PATENT DOCUMENTS 2077914  4/1987  Japan .................... 264/275

Primary Examiner—James Lowe
Attorney, Agent, or Firm—Sughrue, Mion, Zinn, Macpeak & Seas

[57] ABSTRACT

A process for producing a synthetic resin molded article composed of a film or sheet and an injected resin part, comprising fitting a film or sheet to a cavity of a mold in position and then injection molding a thermoplastic resin, wherein said mold has a magnet buried therein at least at a position of the resin passageway at the gate or its vicinities or positions symmetrical about said passageway to form a magnetic fixing part and said film or sheet has a magnet or a ferromagnetic substance fitted thereto at a position or positions corresponding to said magnet fixing part of the mold. The process makes it possible to automate the step of fitting the sheet to the mold, and provides a large-sized or curved molded article excellent in apearance.

3 Claims, 2 Drawing Sheets

PROCESS FOR PRODUCING SYNTHETIC RESIN MOLDED ARTICLES

FIELD OF THE INVENTION

This invention relates to a process for producing an injection molded article composed of an injected resin united with a functional film or sheet (hereinafter simply referred to as sheet) having a function to impart surface gloss, hardness, ultraviolet light resistance, infrared absorption properties or other characteristics or having letters, marks or other designs. More particularly, it relates to a process for fitting a sheet in the right position in a mold cavity by making use of magnetism.

BACKGROUND OF THE INVENTION

It is known to produce composite molded articles by fitting a sheet to an injection mold and then injecting a thermoplastic resin into the mold. In this technique, the sheet can be fitted in a cavity of the mold by mere insertion, or by means of insert pins, or by vacuum suction. The sheet fitted by mere insertion, unless having a specific size or shape, is liable to move out of position with the flow of the injected resin. The sheet fitted by means of insert pins, unless having a specific size or shape, is liable to suffer wrinkling due to the flow of the injected resin and thermal contraction.

On the other hand, when the fitting method by vacuum suction (hereinafter referred to as vacuum method) is applied to production of large-sized articles or articles having a curved surface, a gap may be formed between the sheet and the mold due to the shock or vibration on mold closing to reduce the sucking force. If a resin is injected under such a state, the sheet is shifted out of its proper position or suffers wrinkling, or the sheet is expanded or contracted due to the heat of the injected resin to cause wrinkling. When the article has a curved surface, it is difficult to fit the sheet, particularly its end portions, intimate to the mold because of its rigidity. Even if the sheet is once fitted, the same problem as stated above is apt to arise. Further, since the vacuum method essentially requires a mold having special vacuum ports for suction on the inner wall and vacuum-lines in the inside, the mold is expensive and the operation is complicated.

In addition, it is difficult to automate the sheet fitting in the mold by means of pins or by the vacuum method because robots or the like automatic systems are extremely incompetent in this field.

SUMMARY OF THE INVENTION

One object of this invention is to provide a process for producing a synthetic resin molded article composed of a sheet or film and an injected resin part, in which the sheet or film can be automatically fitted to a prescribed position of a mold.

Another object of this invention is to provide a process for producing a synthetic resin molded article composed of a sheet or film and an injected resin part, by which a large-sized molded article or a molded article having a curved surface excellent in not only two-dimensional but three-dimensional appearance can be obtained.

The inventors have conducted extensive investigations and, as a result, it has now been found that the above objects of this invention can be accomplished by fitting the sheet at a prescribed position of a mold cavity by making use of magnetism.

The present invention relates to a process for producing a synthetic resin molded article composed of a film or sheet and an injected resin part, which comprises fitting a film or sheet to a cavity of a mold in position and then injection molding a thermoplastic resin, wherein said mold has a magnet buried therein at least at a position of the resin passageway at the gate or its vicinities or positions symmetrical about said passageway to form a magnet fixing part and said film or sheet has a magnet or a ferromagnetic substance fitted thereto at the position(s) corresponding to said magnet fixing part of the mold.

In a preferred embodiment of the present invention, the mold has an ancillary part for preventing the sheet from shifting (hereinafter referred to as anti-sheet-shift part) at the gate or the vicinities thereof. In a more preferred embodiment, the anti-sheet-shift part is provided by the both sides of the resin passageway at the gate or in its vicinities in the form of wings, and the magnet fixing part is symmetrically formed in the wings.

BRIEF DESCRIPTION OF THE ACCOMPANYING DRAWINGS

DETAILED DESCRIPTION OF THE INVENTION

For better understanding, the present invention will be described by referring to the accompanying drawings illustrating a molded article and a gate part of a mold according to the present invention.

Figure 1:
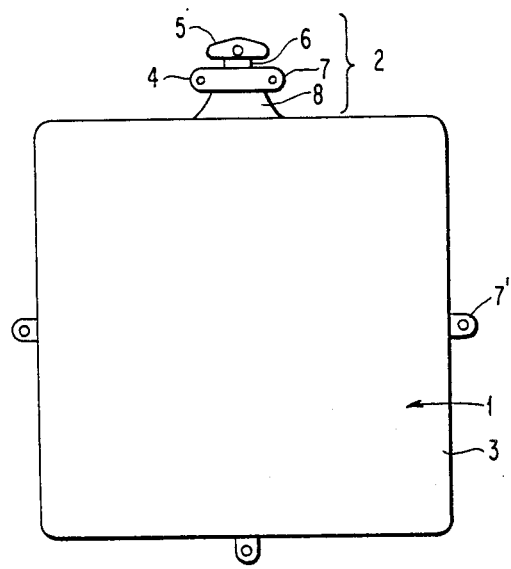
FIG. 1 is a plane view of an example of a transparent molded article according to the present invention.

In FIG. 1, a molded article comprises main body 1 and gate 2. In this particular example, gate 2 has a fan shape expanding toward main body 1, which is suitable for producing a large-sized transparent molded article. Gate 2 is composed of resin introduction part 6 (26 in FIG. 2) directly connected to runner 5, fixing part 7 for fixing with a magnet, and fan-shaped part 8. The fixing part 7, which is provided by the both sides of the resin passageway, has a form of wings for preventing the sheet from shifting, and iron sheet 4 is fitted to the fixing part 7 so that the sheet may be fitted and fixed to the inner wall of the mold by magnetic force. If desired to ensure the fit of the sheet to the mold, fixing parts 7' can be provided at the position opposite to the gate and also at the both sides of the sheet. In this particular case of FIG. 1, since the molded article is an about 30 cm-square flat article, the fixing parts 7' are not always needed. However, in order to prevent the sheet from fluttering or being caught between molds or the like troubles due to vibration or shock on mold closing, the fixing part 7' is preferably provided at the position opposite to the gate. When the molded article has a curved surface or a large size, it is preferable that such a fixing part be provided at not only all of the positions shown but also other appropriate positions not shown.

Figure 2:
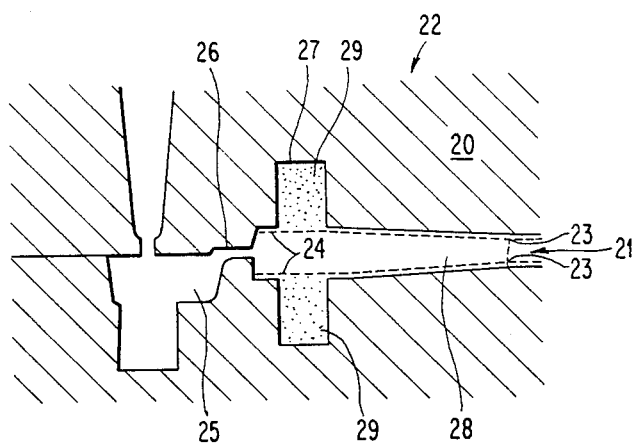
FIG. 2 is a sectional view of a gate and its vicinities of a mold for producing the article of FIG. 1.

FIG. 2 illustrates a section of gate 2 and its vicinities of the mold for producing the molded article shown in FIG. 1. Mold 20 has gate 22 directly connected to runner 25 and cavity 21 corresponding to the main body of the molded article. In the gate 22, recesses are formed by engraving from the cavity side, into which magnet 29, the side surface thereof being coated with brass, is buried to form magnetic fixing part 27. Fan-shaped part 28, expanding toward the cavity as shown in FIG. 1, connects the magnet fixing part and the cavity of the mold.

Functional sheet 23 of a prescribed shape having been previously fitted with a piece of magnet or a ferromagnetic substance, such as iron or a plastic magnet sheet, is fitted to the mold in position taking advantage of magnetic attraction at the fixing part(s).

Since the magnet fixing part 27 at the gate is in the upstream side with respect to the main body of the molded article, it is preferable that the portion of the mold cavity where the fixing part 27 is formed has a larger thickness than the main body, that is, the portion of the cavity has a deeper impression than the portion of the main body as shown in FIG. 2. Further, the fixing part 27 is preferably provided in the both sides (wings) of the resin passageway but not right above or under the resin passageway so that the magnet or ferromagnetic substance (e.g., a piece of iron sheet) fitted to the sheet may not move to the main body side together with the resin flow to cause damage of the mold or the sheet may not shift in the direction of the resin flow. Thus, high reliability of the process can be assured by such designing. In practice, provision of the fixing part in the form of wings is not essential because, with a magnet or a ferromagnetic substance being fitted to the sheet on the side of the mold, the above-described troubles, such as mold damage with the magnet or ferromagnetic substance, do not usually occur even when the fixing part is provided right above or under the resin passageway. However, it is desirable that the mold is provided with an anti-sheet-shift part, such as pins (e.g., rod-like pin, top edge-round pin, etc.), vacuum ports and the like, in order to prevent the sheet from moving toward the resin flow direction. Movement of the sheet toward the resin flow direction can also be prevented by interposing the sheet between two molds. In this case, it is preferred that the interposition part of the mold on which the sheet is fitted, has a depression in a depth smaller than the thickness of the sheet. On the other hand, the above-described special designing is not required for the magnet fixing parts 7' shown or not shown in FIG. 1 because they are in the downstream side with respect to the resin introduction part and, in addition, they are expected to serve to absorb expansion and contraction of the sheet due to the injected resin to thereby prevent wrinkling of the sheet.

While the invention has been explained by reference to the embodiments of the accompanying drawings, it should be understood that the present invention is not deemed to be limited thereto and is suitably applicable to production of molded articles having a larger size or having a curved surface. The present invention is also applicable to production of molded articles having a mirror-smooth surface by the use of a mold having being subjected to mirror polishing.

The magnet to be buried in the mold may be selected from permanent magnet and electromagnet in accordance with the shape of the molded article, the cost of the mold, and the like. In view of ease in production of the mold, permanent magnet would be suitable. Permanent magnet includes alloy magnet, e.g., alunico, Fe-Cr-Co magnet, Cu-Ni-Fe magnet, Mn-Al magnet; oxide (ferrite) magnet; rare earth metal-cobalt magnet; and bond magnet comprising these materials bonded with resins, etc.. The magnetic core material of the electromagnet includes pure iron, Fe-Ni alloys, silicon steel, Fe-Al alloys, Fe-Co alloys, ferrite, etc.

The aforesaid magnet can be buried in the recess of the mold by fixing with a heat-resistant thermosetting resin, or inserting the magnet whose pheriphery is covered with a soft material, e.g., copper or copper alloys.

The attracting force between the sheet and the mold per magnet fixing part can be controlled to some extent by adjusting the magnetic force of the magnet fitted to the mold or the thickness or size of the magnet or ferromagnetic substance fitted to the sheet. Usually, an attracting force (or pull strength) in the vertical direction of about 0.5 kg would be enough to obtain firm fit comparable to that obtained by vacuum fitting.

The positions and attracting force of the magnet fixing parts other than that provided in the vicinities of a gate are selected appropriately depending on the shape of the desired molded article (inclusive of whether the article has a plane surface or a curved surface) and the size and thickness of the sheet. For example, in case of producing a molded article having a curved surface, a plurality of magnet fixing parts should be provided so that the sheet may be well fitted along the curved surface of the mold cavity. The attracting force of these fixing parts can be determined taking the thickness of the sheet to be fitted and the curvature of the mold into consideration. In particular, the attracting force of the fixing parts in positions where the sheet exercises its stiffness should be made greater by increasing the strength of the magnet or the thickness or size of the ferromagnetic substance to be fitted to the sheet. In cases where the sheet is fitted to each of the movable cavity and the fixed cavity, both the magnets in the cavity side (facing each other with the cavity therebetween) have the same magnetic pole.

The sheet (or film) which can be used in the present invention is a film usually having a thickness of from 0.2 to 1 mm and functioning to impart various performances, such as surface gloss, scratch resistance, ultraviolet light resistance, infrared absorption properties, anti-fogging properties, anti-reflection properties, and the like. The sheet may have appropriately formed thereon letters, marks or other designs. It is generally produced from polycarbonate resins, polysulfone resins, acrylic resins, and other transparent thermoplastic resins, with a polycarbonate sheet being preferred. In order to ensure adhesion to injected thermoplastic resins, a back coat may be formed on the back side of the sheet. Taking a polycarbonate sheet for instance, a polycarbonate sheet having a back coat of an acrylic resin is used in the case of injecting an acrylic resin, an ABS resin, an AS resin, a polystyrene resin, etc.; a polycarbonate sheet having a back coat of a non-crystalline saturated polyester resin which is used as a hot melt adhesive is used in the case of injecting an aromatic saturated polyester resin, e.g., PET and PBT; or a polycarbonate sheet having a back coat of an EVA resin is used for general use where heat resistance is not particularly required The magnet or ferromagnetic substance to be fitted to the sheet includes a plastic magnet sheet comprising the above-described permanent magnet and a plastic, an iron sheet, a cobalt sheet, a nickel sheet, etc. Among them, an iron-based sheet, e.g., a zinc-plated iron sheet, is the most available and preferred. These magnet or ferromagnetic sheets have a thickness of from about 0.05 to about 0.5 mm. If the thickness is too small, the attracting force would be insufficient unless a strong magnet should be used, or the magnet should be exchanged, or the preset voltage should be increased in the case of using an electromagnet. If a magnet or a ferromagnetic substance having a thickness exceeding about 0.5 mm is fitted on the side in contact with the mold, a recess having a depth approximate to the thickness of the sheet fitted with such a thick magnet or ferromagnetic substance should be formed on the inner wall of the mold. Otherwise, a large gap would be formed between the sheet and the mold wall. On the other hand, if such a thick magnet is fitted on the opposite side (the side in contact with the injected resin) at the gate or its vicinities, some devices should essentially be invented to prevent the magnet or ferromagnetic substance, if released from the sheet by the force of the injected resin, from moving toward the main body of the molded article or to prevent the magnet or ferromagnetic substance from disturbing the resin flow.

When a plastic magnet sheet is used, the magnetic pole thereof should be opposite to that of the magnet fixing part.

Fitting of the magnet or ferromagnetic substance to the sheet can be carried out, for example, by using a magnet or ferromagnetic piece having nibs or clicks to bite the sheet, or by heat fusion, or by adhesion with an adhesive or a self-adhesive.

The magnet or ferromagnetic substance is preferably fitted to the sheet on the side to be contacted with the mold so as to attain an ensured attracting force and to reduce the resistance to the flowing resin.

The thermoplastic resin to be injection molded is not particularly limited and includes transparent to opaque resins or may contain fillers. From the standpoint of taking full advantage of the present invention, transparent thermoplastic resins are preferred.

The present invention is now illustrated in greater detail with reference to the following Examples, but it should be understood that the present invention is not deemed to be limited thereto.

EXAMPLE 1

Injection Mold:

A mold for producing an article of FIG. 1 (a flat plate of 300×300×4 mm) was used. Each of the movable mold and the fixed mold had buried therein a permanent magnet having a diameter of 10 mm and a length of 15 mm in two points at the gate (i.e., in each of wings at the gate) and one point opposite to the gate in such a manner that each pair of the magnets facing each other had opposite poles.

Sheet:

Two blanks having a shape of FIG. 1 were prepared from an aromatic polycarbonate sheet having a hard coat on one side thereof. A steel sheet having a diameter of 12 mm and a thickness of 0.1 mm was fixed to each of the blanks on its hard coat side by means of an adhesive tape at three positions corresponding to the magnet-fixed parts of the mold to prepare two sheets fitted with pieces of steel sheet.

The sheet with steel pieces was fitted to each of the movable and fixed molds in such a manner that the hard coat side contacted the mold wall. The sheet could be fitted to the mold at the prescribed position simply by bringing it close to the position. The pulling strength required for separating the sheet from the mold at the magnet fixing part in the vertical direction was about 0.3 kg per magnet fixing part.

Then, the molds were closed, and an aromatic polycarbonate resin ("Iupiron S-3000" produced by Mitsubishi Gas Chemical Company, Inc.) was injected at a cylinder temperature of 290° C., a mold temperature of 80° C., and an injection pressure of 1600 kgf/cm$^2$ to obtain an injection-molded article having a hard coat on both sides thereof.

On close examination, the resulting molded article was found to have satisfactory appearance without suffering shift or wrinkling of the sheet in the vicinities of the gate or infiltration of the injected resin between the sheet and the mold.

In the above-described example, when the thickness of the steel pieces to be fitted to the sheet was changed to 0.3 mm with other conditions being the same, the pulling strength per magnet fixing part was about 0.6 kg.

EXAMPLE 2

A helmet cover (protective glass) was produced as a curved molded article.

Figure 3:
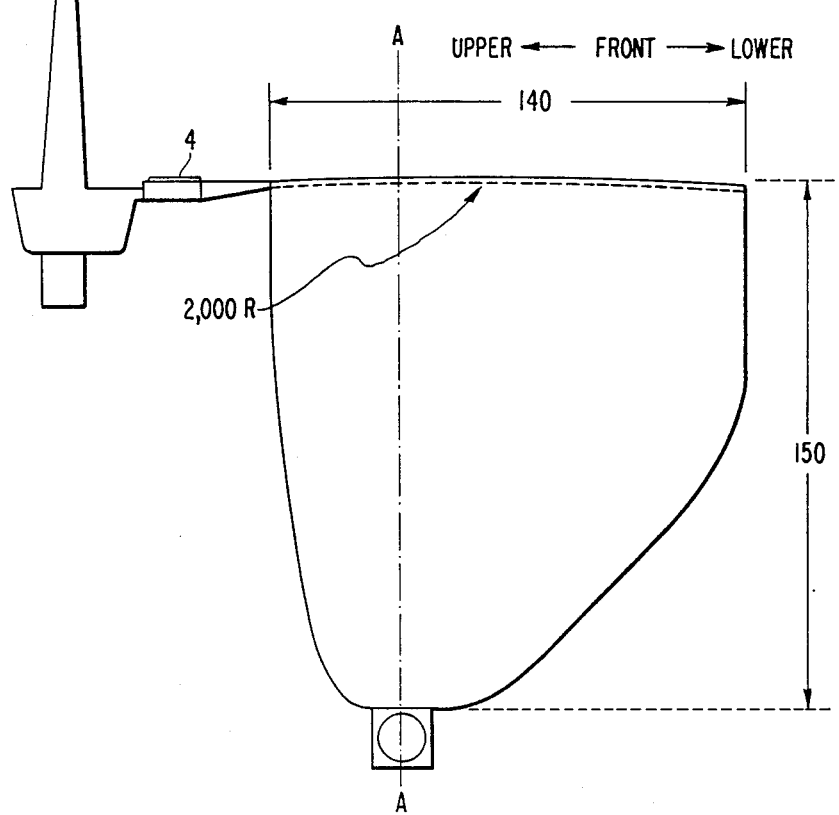
FIG. 3 is a plane view of a curved molded article prepared according to Example 2 of the present invention.
Figure 4:
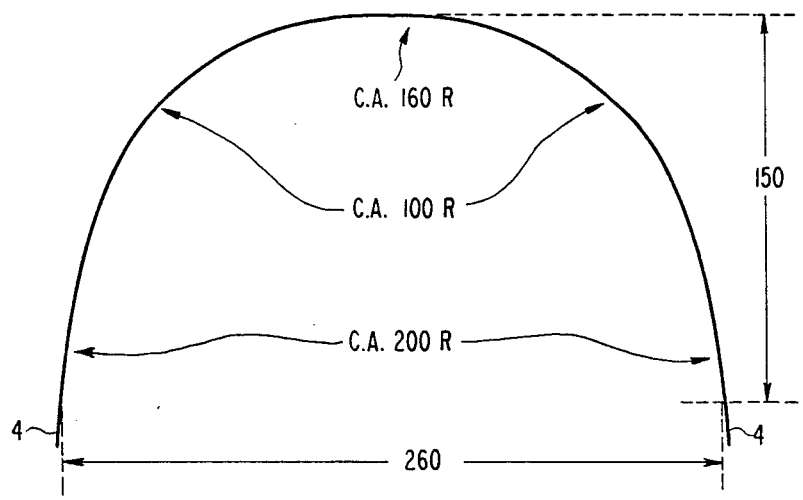
FIG. 4 is a cross-sectional end view taken on line A—A of FIG. 3.

The mold used had a gate portion having the same shape as shown in FIG. 1 at a front, central and upper edge portion of the helmet cover, and had a shape that height of a center portion is 140 mm, its curvature radius is 2,000 mm, width is 260 mm, depth is 150 mm, curvature radius of the front portion is about 160 mm, the curvature radius of the side portion is about 200 cm, the curvature radius of from the front portion to the side portion is about 100 cm, and thickness is 2.2 mm as shown in FIGS. 3 and 4. Wings were provided at the gate portion of the fixed mold side and both side edges most far from the gate and outside the molded article body to form magnet fixing parts, and each permanent magnet having a diameter of 12 mm and length of 15 mm was inserted and fixed. The polishing degree of the mold cavity surface was #800 at the fixed mold side and #3,000 at the movable mold side.

A sheet was prepared from an aromatic polycarbonate sheet having a 0.5 mm hard coat on one side thereof by punching the sheet into a shape such that the curved face is stretched into a plane face, except that the length of the helmet cover in the height direction is 140 mm, disregarding the curvature radius. A steel sheet having a diameter of 15 mm and a thickness of 0.2 mm was fixed to the sheet on its hard coat side with an adhesive tape at the same position corresponding to the magnet-fixed part of the mold to prepare a punched sheet with a steel sheet.

The sheet with a steel sheet was fitted to each of the movable and fixed molds in such a manner that the hard coat side contacted the mold wall. The pulling strength required for separating the sheet from the mold at one magnetic fixing part in the vertical direction was 0.7 kgf.

Then, the molds were closed, and an aromatic polycarbonate resin ("Iupiron S-3000" produced by Mitsubishi Gas Chemical Company, Inc.) was injected at a cylinder temperature of 290° C., a mold temperature of 80° C., and an injection pressure of 1600 kgf/cm$^2$ to obtain an injection-molded article having a hard coat on one side thereof.

On close examination, the resulting molded article was found to have satisfactory appearance without suffering shift or wrinkling of the sheet in the vicinities of the gate or infiltration of the injected resin between the sheet and the mold.

It is impossible to fit the sheet to the mold for a helmet cover by a vacuum suction method, due to a force that the sheet returns to the curved face. Further, in the conventional pin-fixing method, it is difficult to make the angle of the pin and the pick-up direction of a molded article from the mold the same direction. Thus, those methods are difficult to practice.

According to the process of the present invention wherein the sheet is fixed by magnetism, a magnet or a ferromagnetic substance (e.g., iron) fitted to the sheet and attracted by a magnet buried in the mold is strongly resistant to separation in the vertical direction, and such an attracting force is not substantially reduced by a little gap, while it is allowed to slightly slip in the lateral direction. Therefore, the attracting force is not substantially reduced on receiving vibration at the time of mold closing, tightly holding the sheet in a proper place. Further, expansion and contraction of the sheet due to heat immediately after being fitted can be absorbed by slight slip in the lateral direction without reducing the attracting force.

Thus, the sheet can always be fitted stably irrespective of its size or shape, inclusive of whether it has a curved surface or not to thereby provide satisfactory molded articles. Since the magnet fixing part allows the sheet to shift in the lateral direction as mentioned above, it is preferable that the mold is provided with an anti-sheet-shift part as an ancillary part at the gate or its vicinities so as to prevent the sheet from shifting to the flow direction of the injected resin.

Even when the sheet is inserted at a position slightly shifted from the right position, the position of the sheet can be corrected by magnetic attraction. Therefore, the positioning of the sheet can be greatly simplified as compared with fitting by means of insert pins or vacuum fitting, thereby making it possible to automate the sheet fitting step.

As described above, the present invention provides a process for fitting a sheet or film to a mold cavity with markedly increased reliability over conventional techniques, making it possible to easily produce such a molded article having a large size or a curved surface which has conventionally encountered difficulty.

In carrying out the present invention, it is necessary to fix a magnet to a mold and to fit a magnet or a ferromagnetic substance, e.g., an iron piece, etc., to a sheet or a film in advance. Nevertheless, the fixation of a magnet to the mold can be effected on an industrial scale with ease and convenience just like insertion of pins, and fitting of an iron piece, etc. to the sheet can also be effected very simply, thus satisfying an economical requirement.

In addition, the present invention eliminates factors which have made automating difficult, such as positioning, because the fitting of the sheet to the mold is performed by magnetic attraction. Accordingly, even when other means, e.g., insert pins, are utilized in combination, the whole process can be simplified to facilitate automating of the process, which would be of great industrial significance.

While the invention has been described in detail and with reference to specific embodiments thereof, it will be apparent to one skilled in the art that various changes and modifications can be made therein without departing from the spirit and scope thereof.

What is claimed is:

1. A process for process for producing a synthetic resin molded article composed of a film or sheet and an injected resin part, which comprises fitting a film or sheet to a cavity of a mold in position, which mold has a gate, and wherein a resin passageway which has at least two sides is provided at the gate of the mold and then injection molding a thermoplastic resin, wherein said mold has ancillary means which is provided in the at least two sides of the resin passageway at the gate of the mold or in the vicinity of the gate of the mold in the form of wings and a magnet buried therein at least at a position of the resin passageway of the mold at the gate of the mold or in the vicinity of the gate of the mold or at positions symmetrical about said resin passageway to form a magnet fixing part, and said film or sheet is processed into a shape containing wings of the mold and has a magnet or a ferromagnetic substance fitted thereto at a position or positions corresponding to said magnet fixing part of the mold.

2. A process as claimed in claim 1, wherein the magnet fixing part is formed in the wings.

3. A process as claimed in claim 1, wherein the magnet fixing part is provided in at least one position downstream of the resin passageway for injected resin introduction in the cavity of the mold.

* * * * *